United States Patent [19]

Plummer

[11] 4,272,186
[45] Jun. 9, 1981

[54] CAMERA METHOD AND APPARATUS FOR RECORDING WITH SELECTED CONTRAST

[75] Inventor: William T. Plummer, Concord, Mass.

[73] Assignee: Polaroid Corporation, Cambridge, Mass.

[21] Appl. No.: 40,668

[22] Filed: May 21, 1979

[51] Int. Cl.³ .................. G03B 27/52; G03B 27/72
[52] U.S. Cl. ........................... 355/34; 355/38; 355/68; 355/71; 355/77
[58] Field of Search .............. 355/33, 34, 71, 35–38, 355/67–70, 77

[56] References Cited

U.S. PATENT DOCUMENTS

| | | | |
|---|---|---|---|
| 992,151 | 5/1911 | Berthon . | |
| 1,838,173 | 12/1931 | Chretien . | |
| 1,985,731 | 12/1934 | Ives ................................. | 355/33 X |
| 2,252,006 | 8/1941 | Holst et al. . | |
| 2,304,988 | 12/1942 | Yule . | |
| 2,316,644 | 4/1943 | Yule . | |
| 2,407,211 | 9/1946 | Yule . | |
| 2,455,849 | 12/1948 | Yule . | |
| 2,691,586 | 10/1954 | Yule et al. . | |
| 2,992,103 | 7/1961 | Land et al. . | |
| 3,506,350 | 4/1970 | Denner .............................. | 355/40 |
| 3,905,701 | 9/1975 | David ................................ | 355/71 |
| 3,954,334 | 5/1976 | Bestenreiner ..................... | 355/52 |
| 3,973,953 | 8/1976 | Montgomery ..................... | 96/1 R |
| 3,973,954 | 8/1976 | Bean ................................. | 96/1 R |
| 3,973,957 | 8/1976 | Montgomery ..................... | 96/1.1 |
| 3,973,958 | 8/1976 | Bean ................................. | 96/1.1 |
| 4,040,830 | 8/1977 | Rogers ............................. | 96/73 |

FOREIGN PATENT DOCUMENTS 2443674  3/1976  Fed. Rep. of Germany .

OTHER PUBLICATIONS

*Research Disclosure*, 17533, Nov. 1978, Gilmour, "Optical Method for Curve Shape Control."

*Primary Examiner*—L. T. Hix
*Assistant Examiner*—W. J. Brady
*Attorney, Agent, or Firm*—David R. Thornton

[57] ABSTRACT

The provision in front of the image surface of a photosensitive element of a device that selectively directs image light with increased intensity to microscopic, spaced-apart portions of the image surface yields a photograph or like record having a selectively decreased contrast. The photograph is viewed independently of its location relative to the light directing device. Changing the apparent aperture through which image light reaches the light-directing device can control the amount of contrast decrease. Further, selective filtering of a portion of the incident light separately controls the contrast of high-exposure portions of the image.

42 Claims, 12 Drawing Figures

CAMERA METHOD AND APPARATUS FOR RECORDING WITH SELECTED CONTRAST

BACKGROUND OF THE INVENTION

This invention relates to the selective reduction of the contrast of a photograph or other photo-recorded image.

The invention provides camera apparatus and methods which can reduce the contrast with which an image is recorded, which can automatically select the amount of contrast reduction, and which can selectively decrease contrast jointly or separately for different spectral regions, i.e. for different colors being recorded.

Photographic technology has heretofore provided film with various speeds and color sensitivities, and has provided cameras with automatic focus, automatic illumination, and automatic exposure. But control over contrast, which determines the extent to which the photograph captures the tonal character of the scene, has not been attained in a manner suitable for wide commercial application.

Yet reduction of contrast is often desired. For example, it can improve the range of tones recorded from a bright scene, which too often is photographed with harsh highlights and/or underexposed shadows. A reduction in contrast has also long been desired in photographic copiers. The copying of a photograph, whether a positive or a negative, with standard films and standard photo-processing, produces a copy with more contrast, and correspondingly less range of tonal definition, than is present in the original document being copied. Resort to special low contrast films and/or special processing has been a costly and often inconvenient solution.

The prior art of techniques related to this invention for reducing the contrast of a photo-record includes U.S. Pat. No. 3,973,954 of Bean, and No. 3,973,953 of Montgomery. These patents disclose exposing an optically sensitive surface through a lenticular screen in a manner to record an imperfect image. The patents appear to teach that a camera or other optical recording system that provides greater contrast range can be obtained, but at the expense of resolution. U.S. Pat. Nos. 3,973,958 and 3,973,957 also disclose exposure through lenticular screens, but to project sharply focused images for the purpose of increasing sensitivity and speed in a deformation imaging system. Another prior art instant of exposure through a lenticular grating appears in U.S. Pat. No. 3,954,334, where a motor element moves a lenticular screen transversely of image light being recorded.

The 1911 Berthon U.S. Pat. No. 992,151 discloses introducing a refractive surface formed by minute proturbances of microscopic proportions in front of a photosensitive layer, apparently for the purpose of recording different colors. The 1931 U.S. Pat. No. 1,838,173 of Chretien discloses the increase in photographic luminosity by configuring small refracting lenses on a photographic negative such that each lens concentrates exposure to a small area of the negative. The prior art also includes U.S. Pat. No. 2,992,103, which discloses a multi-layer photographic film structure that includes a lenticular screen member through which the photosensitive layers are exposed and through which the resultant recorded image is viewed.

Prior teachings regarding half-tone reproductions also include techniques for selecting contrast. See for example Yule U.S. Pat. Nos. 2,304,988; 2,316,644; 2,407,211; 2,455,849 and 2,691,586; in addition to Denner U.S. Pat. No. 3,506,350, which concerns a print copier.

An object of this invention is to provide a camera method and apparatus for obtaining improved reduction of contrast in a photo-record. A further object is to provide camera method and apparatus which allows control of the contrast reduction.

It is also an object to provide camera apparatus and method which automatically changes the contrast reduction in response to relative brightness range in the scene being recorded.

Another object is to provide a photo-recording method and apparatus for selectively modifying the contrast in highlight, or high exposure, portions of a scene. It is also an object to provide such contrast control separately for different colors.

More specific objects of the invention include the provision of a photographic camera which provides selective controlled reduction of contrast, and the provision of a print copier which can provide a photocopy with the same or lesser contrast than in the original without the use of special films or processing.

It is also an object of the invention to provide a novel film structure for use in photography with reduced contrast.

Other objects of the invention will in part be obvious and will in part appear hereinafter.

The invention accordingly comprises the several steps and the relation of one or more of such steps with respect to each of the others, and apparatus embodying features of construction, combinations of elements and arrangements of parts adapted to affect such steps, all as exemplified in the following detailed disclosure, and the claims indicate the scope of the invention.

BRIEF DESCRIPTION OF THE DRAWINGS

For a further understanding of the nature and objects of the invention, reference should be had to the following detailed description taken in connection with the accompanying drawings, in which.

SUMMARY OF THE INVENTION

In accordance with the invention a controlled selected distribution of image light is directed to spaced microscopic portions of a recording surface, so as to increase the exposure of non-overlapping surface portions and to decrease the exposure of other portions. In response to this microdistribution of the image light, the recording element records the scene with less contrast than would otherwise result. The photo-record hence has a reduction in overexposed highlights and has more tonal gradation in shadows. The contrast-reducing micro-distribution of light is preferably provided by a minimally absorbing grating element, such as a lenticular screen. The grating element in most embodiments has a structural periodicity along at least one direction. For example, a screen of parallel cylindrical lenticules has structural periodicity along one axis transverse to the elongation of the lenticules. The practice of the invention contemplates providing the micro-distributing element either in the camera structure or directly on the film structure.

In addition, an aperture device interrupts the light passing to the light-distributing element and changes the apparent aperture as seen by that element to alter and thereby control the micro-distribution which it imparts to the light. This, in turn, controls the extent to which the distributing element reduces contrast. More particularly, the aperture device changes the aperture dimension in a direction of periodicity of the distributing element. One aperture device in an absorbing screen with stripes of selected optically dense material spaced apart along a direction parallel to a direction of distributing-element periodicity. Another aperture device is a plate with an opening of selected dimension as measured parallel to the periodicity direction. Movement of the aperture device which changes this dimension, such as rotation of the noted striped screen or rotation of a plate having a non-round aperture, changes the effective aperture dimension and thereby controls the degree of contrast reduction.

As a further feature of the invention, the aperture device can employ a selected color structure to impose differing control on different spectral regions being recorded.

One camera embodiment also has an aperture-controlling system with optical sensors. The system measures the range of brightness in the scene being recorded, and adjusts an aperture device to provide a degree of constant reduction selected in response to the incident brightness-range condition.

Further in accordance with the invention, the micro-distributing element can be combined with an aperture stop of selected optical transmission for controlling the contrast of image highlights essentially independently of shadows. More particularly, instead of using an opaque aperture stop, a transmissive aperture stop of dense neutral material can be combined with a larger opaque stop. The smaller aperture within the dense material allows control of contrast, as described. The optically dense annular region around this aperture exposes the sensitive recording medium with additional image light; the distributing element directs this light to expose contiguous or overlapping image surface regions. This exposure with additional image light can assure that highlights of the scene being recorded are brought to substantially full exposure over the entire scene within a reasonably brief exposure time.

Furthermore, the transmissive aperture stop can be not only of neutral density but of selected spectral transmission, e.g. employ a filter, to pass one or more colors as appropriate to control the overall response to a color recording medium, such as photographic color film.

Another feature of the invention provides at least two aperture stops with different aperture dimensions and different spectral transmission characteristics, e.g., one is a cyan filter and the other is a magenta filter, to control contrast independently for each color, or any combination of colors, in the scene being recorded.

Contrast reduction in accordance with the invention can also be achieved with a light-distributing element located against or carried on a film unit or other photo-recording medium. It is preferable for at least many embodiments that the distributing element be of such fine, i.e. microscopic, structure that the image thereof on the recording medium is beyond the resolving capability of the medium.

The foregoing and other features of the invention described below bring the control of contrast in photographs and other photo-records to the level of widespread commercial application. For example, the invention makes possible a photographic copier of prints and negatives which, using conventional photographic film, can yield copies having the same or even less contrast than the original. The invention also makes possible a camera which provides selective contrast control, either automatically or manually. Another practice which the invention makes possible, with the above-noted spectrally selective contrast control, is the use of film, particularly color film, which might otherwise be considered defective because it has spectral response characteristics other than those specified.

The foregoing and other features of the invention are described with principal reference to photographic practice, but the invention can advantageously be used in other photo-recording practices, including, for example, xerography.

DESCRIPTION OF ILLUSTRATED EMBODIMENTS

Figure 1:
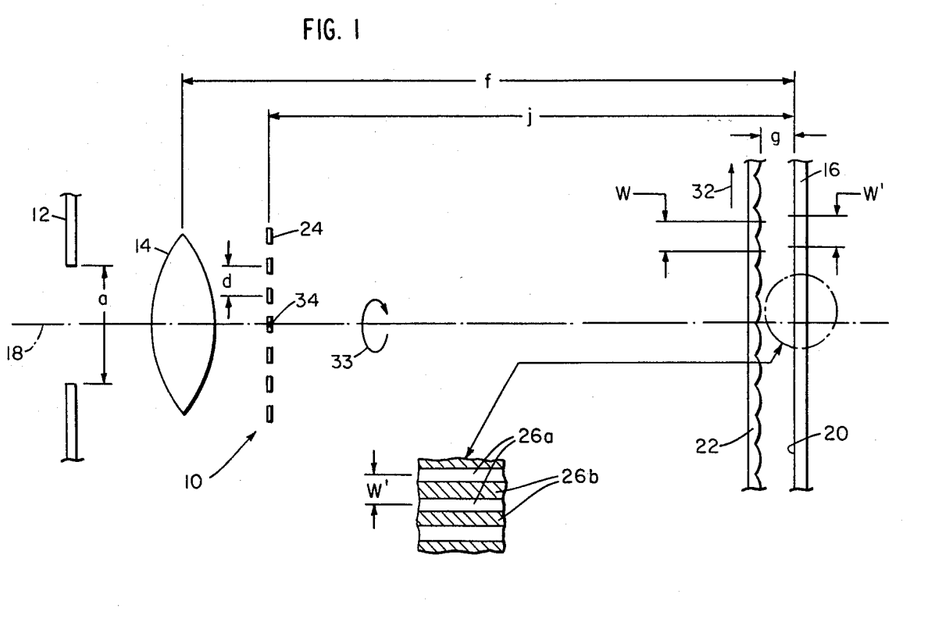
FIG. 1 is a schematic representation of a camera system embodying features of the invention.

FIG. 1 shows a camera system 10 in which an aperture plate 12, an imaging lens 14 and a photosensitive medium 16 are aligned optically along an axis 18. The photosensitive medium is located at a planar image surface 20. Closely in front of the image surface is a light distributing grating 22, illustrated as an array of side-by-side cylindrical lenticules. Spaced further from the image surface, to be near the lens aperture, is an aperture screen 24, illustrated as an array of side-by-side stripes of optically dense material separted by equal gaps. The light-distributing grating 22, by virtue of its self-imaging property, directs incident light from the scene to be recorded to restricted zones or portions 26a of the image surface. These portions 26a receive greater exposure than in the absence of the grating 22, and are spaced apart by portions 26b (shown only for clarity as shaded) that receive lesser exposure. The aperture screen 24, which provides one or more openings of selected size and spacing, is present to ensure that all images of the grating 22 are in or near registration with one another at the image surface.

More particularly, each cylindrical lens of the illustrated grating 22 forms an image of the aperture screen 24 upon the medium at the image surface 20, with great demagnification. The parameters of the aperture screen, e.g. location and stripe spacing, are chosen relative to other parameters of the system 10 to make the several overlapping images formed by the different grating lenticules coincide at the image surface 20. The resulting contrasting image pattern is blurred, of course, by lens diffraction and the like imperfections. However, the diffraction of the lenticular grating can be made small by keeping the focal length of each cylindrical lens short, but long enough to provide mechanical clearance between the grating 22 and the photosensitive medium 16 and to keep the modulation of the light distribution substantially insensitive to precise location of the photosensitive medium.

With this arrangement, the camera system 10 exposes the photosensitive medium 16 to record the image with less contrast, and correspondingly with greater tonal content, than would occur with a conventional camera structure. The camera system 10 attains this result because it in effect exposes the photosensitive medium, from every point of the scene in the instrument field of view, with light having two levels of intensity. The surface portions 26a are exposed with light of enhanced intensity and the portions 26b are exposed with reduced intensity, both relative to the intensity levels that would result without the grating 22 and the screen 24. This distribution of image light is microscopic in dimension and hence is not perceptible to a viewer of the resultant photorecord, except under magnification greater than conventional photographic enlargement. The exposure with enhanced intensity records, in the surface portion 26a, shadows and other low-level scene elements with more tonal fidelity, whereas the diminished intensity directed to surface portions 26b records highlight elements with more fidelity. The visual perception of the images recorded in this manner, after being developed, is a composite of the two levels of exposure.

Further details of the FIG. 1 camera system 10 are that the spacing or interval (w') on the image surface 20 between adjacent highly exposed portions 26a is determined as follows by the geometrical relation of the path length (j) between the aperture screen 24 and the image surface 20, the interval (w) between the grating lenticules, and the spacing (g) between the grating and the image surface, as designated in FIG. 1.

$$w' = jw/(j-g) \tag{1}$$

Equation 2 gives the relation between the path length (j), the spacing (g), and the focal length ($g_o$) of each cylindrical lenticule.

$$1/g_o = 1/(j-g) + 1/g \tag{2}$$

The distance (j) can, in different embodiments, be constructed equal to the focal length (f), be less as appears in FIG. 1, or be greater. The diffraction blur in the image at the surface 20, caused by the small size of the lenticular units of grating 22, will be of angle $\lambda/w$ and of width $g\lambda/w$, where $\lambda$ is the wavelength of interest. For a preferred sharp image of the aperture screen 24 at the image surface 20, the diffraction blur is to be smaller than the modulation interval w' by a factor of five, which yields the relation of equation 3.

$$g\lambda/w < 0.2\ w' \tag{3}$$

And to attain coincident images of the aperture screen 24 at the image surface, the parameters satisfy equation 4, which defines the interval (d) of the screen 24.

$$d = w'(j-g)/g = wj/g \tag{4}$$

One specific construction of the camera system 10 employs a distributing grating 22 formed of plastic sheet with index (n) equal to 1.5. The grating is ruled with cylindrical lenses of focal length ($g_o$) with a cylindrical radius (r) defined as $$r = (n-1)g_o \tag{5}$$

With a lenticule width (w), the back surface of the distributing grating departs from a plain surface by approximately $$w^2/8r = w^2/8(n-1)g_o \tag{6}$$

This irregularity is at least as great as the wave length ($\lambda$), representing a transmitted wavefront disturbance of $\lambda/2$, to avoid meeting the Rayleigh criterion for a polished surface.

Further parameters of the example for $\lambda = 0.55 \times 10^{-3}$ mm are: w=0.1 mm; j= f=90 mm; and $g_o$=3.5 mm. The computed parameters are g=3.64 mm; w'=0.104 mm; and d=2.47 mm. One-half or fifty percent of the aperture screen can be clear, so that the stripes and spaces are of equal width. The diffraction blur at the film plane is B=$\lambda$g/w=0.02 mm=0.2 w'; and the diffraction degradation of the image at the surface 20 caused by an aperture screen 24 having clear interstripe spacings of d/2 is roughly 2f$\lambda$/d=0.04 mm. The ruling depth of the screen lenticules for a refractive index (n) of 1.49 is $w^2/8(n-1)g_o = 0.73 \times 10^{-3}$ mm.=1.3$\lambda$. This ruling depth is practical, and the mechanical clearance (g) is ample for commercial manufacture and use. The recorded image is sharp, and the lines of the distribution grating are not readily visible in the resultant photograph. Those skilled in the camera art will understand that the cylindrical lenses of the distributing grating 22 can be compression molded or embossed at relatively little expense, and that the aperture screen 24 can be punched from material of suitable opacity or can be printed on transparent material.

Figure 2:
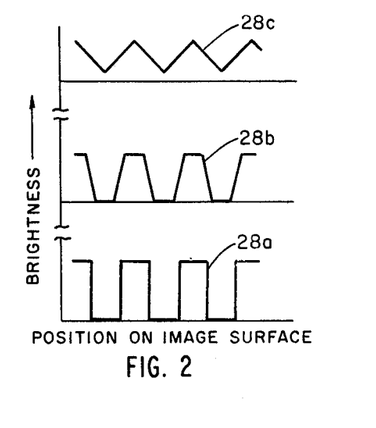
FIG. 2 is a graphical representation of three patterns of light distribution illustrative of features of the invention.

FIG. 2 shows with a graph 28a an idealized distribution of image light which the FIG. 1 camera system can produce at the image surface 20. Consistant with the foregoing reference to two levels of intensity at the surface 20, this curve 28a depicts the light distribution as essentially a square-wave spacial modulation with high exposure at the bright surface portions 26a and low exposure occurring at the intervening surface portions 26b. Light in the low-exposure portions 26b is present only by slight allowed transmission through the dark members of screen 24, by accidental scatter from the lenticular members of the grating element 22, or by lateral scatter within the sensitive medium 16 itself from adjacent bright portions 26a.

Further features of the camera system 10 described hereinafter enable the light distribution to change to less modulated patterns, two of which FIG. 2 illustrates with distribution graphs 28b and 28c. These graphs show that as the system reduces the effectiveness of the light distributing grating 22, the distribution of light across the image surface 26 becomes less modulated so that the bright surface portions 26a become less distinct and spread to the point of contiguity and then overlap. In the limit where the effectiveness of the grating element 22 is minimum, it imparts essentially no modulation to the image light.

Figure 3:
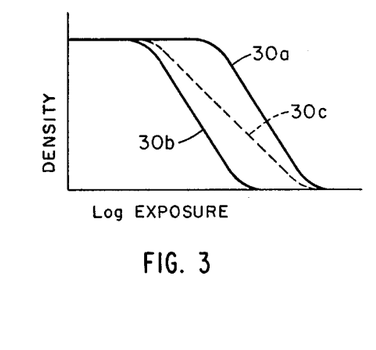
FIG. 3 shows density-exposure curves for direct positive photography.

FIG. 3 shows density-exposure curves for a direct-positive photographic medium 16 and illustrates the effect of distributing image light to discrete portions of the image surface, with modulation such as the FIG. 2 graph 28a shows, to reduce contrast. Curve 30a represents the response of the medium to the lesser or diminished exposure which the surface portions 26b receive, whereas curve 30b represents the resultant density in the photographic medium at the more brightly exposed surface portions 26a. Both curves have essentially identical slope, which represents the contrast characteristic of the medium 16. However, where the distribution grating modulates the light in a manner such that the two curves overlap as shown, i.e., the "shoulder" of the curve 30a occurs at an exposure value less by a small measure than that for the "toe" of the curve 30b, the apparent contrast with which the medium 16 records the spatially modulated image is that of the resultant curve 30c. This curve has significantly less slope than either curve 30a or 30b. This lesser slope designates that the contrast of the resultant photographic record is correspondingly reduced, as desired.

Curve 30c can, to at least a close approximation, be derived mathematically, for the case of a distribution-modulation pattern too fine to be resolved by the photographic or other material of medium 16, by taking an area-weighted average of the densities represented by curves 30a and 30b for any particular exposure. In the case of a pattern resolved by the medium 16 but not by the human eye, the curve 30c can very nearly be derived from the area-weighted average of the respective reflectivities, as determined from the density scale. The area value for computing each weighted average measures the area of bright surface portions 26a relative to the area of diminished surface portions 26b, and hence is controlled by the ratio of open to occluded areas of the aperture screen 24. (The same effects just discussed with reference to FIG. 3 occur with a negative photographic medium, and the same analysis applies, provided the density scale in FIG. 3 is reversed, as those in the art will comprehend.)

A significant feature of the invention, noted above with reference to FIG. 2, is providing control of the effectiveness of the grating 22 or other distributing element. This control accordingly selectively changes the degree of contrast reduction which the camera system 10 provides. The control can be viewed as changing the apparent dimension of the aperture, from which the distributing element is illuminated, in a selected direction relative to the distributing element.

More particularly, with further reference to FIG. 1, the illustrated grating 22 has an optical periodicity, formed by the periodic structure of the cylindrical lenticules, along an axis 32 that is parallel to the plane of the drawing and transverse to the cylindrical lenticules. In general, the periodicity axis is longitudinal to the image surface 20. This axis 32 is parallel to the direction along which the stripes of the screen 24 are spaced apart. A change in the screen 24 orientation which changes the dimension of the screen 24 openings as measured parallel to this periodicity axis of the distributing element 22 changes the spatial modulation which the distributing element imparts to light incident upon the image surface 20. For example, rotation of the screen 24 about the optical axis 18, as indicated with arrow 33, increases the effective aperture between the screen stripes, as measured along the periodicity axis 23, and hence reduces the modulation of the image surface light. Consequently it diminishes the amount of reduction in contrast. The angle of rotation that effectively eliminates the modulation depends on the aperture of lens 14 and can be calculated with known techniques.

Figure 4:
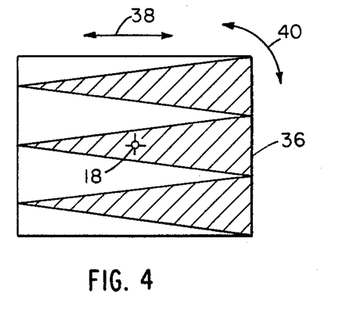
FIGS. 4, 5 and 6 show aperture control elements for use in practicing the invention.

A variety of structures other than the illustrated striped screen 24 can provide aperture control for the distribution element 22, and they can be located forward or behind the lens 14. As a first example, each stripe of the illustrated screen 24 can be a rotatable slat of a venetian blind-like structure, with each slat rotation being about an axis passing through that particular slat and parallel to the longitudinal axis of the stripe or slot, i.e., parallel to an axis 34 perpendicular to both the optical axis 18 and the illustrated periodicity axis 32, and illustrated located on the axis 18. FIG. 4 shows, as a further example, a comb-like screen 36 having toothlike regions of selected opacity or other decreased optical transmission. In addition to rotation about the FIG. 1 axis 18, the comb-like screen 36 can be translated back and forth as indicated with arrow 38, or rotated in the direction indicated with arrow 40, to control the effective aperture for the distributing element 22. It will also be understood that a pair of interfitting comb-like screens movable relative to one another to adjust the interfit of the comb-like structures can provide the desired control over aperture dimension.

The aperture screens described above with reference to FIGS. 1 and 4 are typically located closely behind the lens 14, as shown in FIG. 1 for the screen 24. However, one can employ these and other aperture screens between lens elements or closely in front of the lens, typically in place of the aperture plate 12. In each such embodiment, the aperture screen in effect provides multiple sources, each of small width, from which image light illuminates the distributing element 22. The latter element projects, from each such apparent source, a modulated micro-distribution of image light onto the recording medium 16. The several distributions from the several apparent sources are essentially in registration at the image surface 20, as discussed above and as particularly noted with reference to Equation 4. The result is the desired decrease in contrast, as also described.

A similar result can be achieved with a single apparent source of sufficiently small dimension to produce distinct bright portions 26a (FIG. 1), e.g. which are only slightly overlapping or spaced from one another. An aperture screen for use with such a single aperture can provide control over the degree of contrast reduction, as described below with reference to FIGS. 5 and 6. It will be appreciated that the dimension of the single aperture along the periodicity axis 32 (FIG. 1) corresponds at least in part to the interval (d) of the FIG. 1 aperture screen 24. For example, practice of the invention with a single aperture can employ an aperture dimension that is slightly larger than the interval (d) for the same configuration, and which an aperture control element reduces to a fraction of that interval dimension as appropriate to provide the desired contrast. Thus, the single aperture dimension typically can range from about 1.2(d) to 0.5(d), depending on other parameters and the operation desired. As one specific example with a distributing element having spherical lenticules in an arrangement of the type described below with reference to FIG. 9, a single circular aperture of diameter equal to the interval (d) will yield, on the image surface, circular bright surface portions that are just contiguous with one another, with reduced brightness portions between these circular images. Where the distributing element has cylindrical lenticules as in FIG. 1, such an aperture will yield bright portions elongated parallel to these lenticules and just contiguous, but with lesser brightness at the edges of each than at the center.

Figure 5:
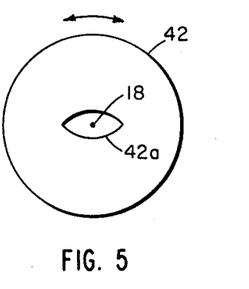

In FIG. 5, a contrast-controlling aperture plate 42 is shown for placement centered on the optical axis 18 and rotatable about that axis. The illustrated control plate 42 has a centrally-located non-round opening 42a for changing the effective aperture through which the distributing element 22 is illuminated, as measured along the direction of its periodicity axis 32, upon rotation of the control plate. The illustrated opening 42a is lenticular in shape, but other non-round contours can be used, as those skilled in the art will now appreciate. The size of the opening 42a required to produce a distribution modulation of image light on the surface 20 is such that the numerous images of that opening which the grating element 22 forms on the surface 20 are separate, i.e. non-contiguous.

Figure 6:
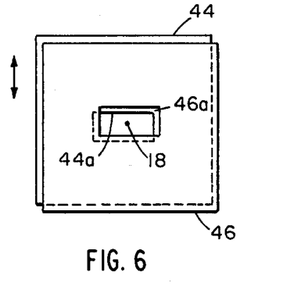

FIG. 6 shows a control system employing two plates 44 and 46. Each plate has an aperture 44a, 46a, and the two plates are arranged one in front of the other with the apertures in at least partial registration on the optical axis 18, as shown. The plates are movable relative to each other in the direction of the FIG. 1 axis 32, as indicated with the arrow in FIG. 6, to adjust the degree of aperture registration and thereby control the dimension of the composite aperture through which the distributing element 22 is illuminated. Those skilled in the art will now comprehend that an aperture control system as shown in FIG. 6 can have multiple apertures in each plate, to provide an aperture screen with multiple openings such as the FIG. 1 screen 24 provides.

Alternative to making the aperture screen 24 with stripes of spectrally neutral absorption, another feature of the invention applicable, for example, to color photography is to use colored stripes, i.e. stripes having selected spectral absorption. Such an aperture screen makes it possible to control contrast separately for each color to which the recording medium 16 responds. Further, such an aperture screen can have the differently colored stripes arrayed independently for each color to project on the sensitive medium 16 regions of enhanced exposure that are staggered or interlaced for the different colors. The areas of the medium 16 which receive enhanced exposure for each color may then be spatially removed from those for each other color. This reduces chemical inter-layer effects when the medium 16 is a photographic color film and hence can yield increased system color latitude in the recorded image.

Figure 7:
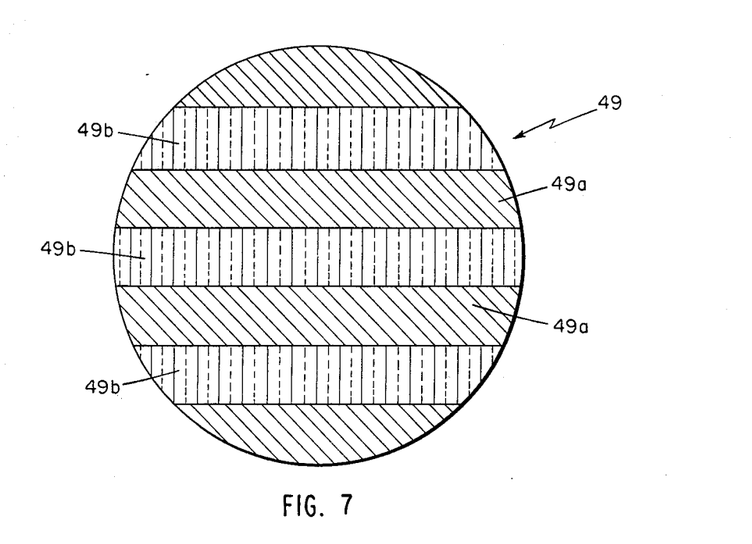
FIG. 7 shows a spectrally-selective aperture screen.

FIG. 7 shows one such color-enhanced aperture screen 49 having green stripes 49a alternated with magenta stripes 49b. The illustrated stripes 49a and 49b are of equal width. This illustrated screen will, in the camera system 10 in place of the screen 24 shown in FIG. 1, expose a multi-layer color-sensitive photographic medium 16 in such a manner that the film layer responsive to red light receives brightened exposure at locations offset from those in the other layers.

With further reference to FIG. 7, the two sets of stripes can be on a single plate-like structure, as illustrated. Alternatively, each set of stripes can be mounted separate from the other, as on a separate plate (not shown) having optically clear spaces between the colored stripes of the set which that plate carries. A more general embodiment, also not shown, employs three plates, one bearing only spaced cyan stripes, another bearing only spaced magenta stripes and a third bearing only spaced yellow stripes. Each plate is moveable independently of the others to adjust the degree and arrangement of stripe overlap relative to the other plates. Further degrees of control freedom are achieved by mounting each plate for rotation, about the optical axis 18 on which it is centered, independently of the others.

Figure 8:
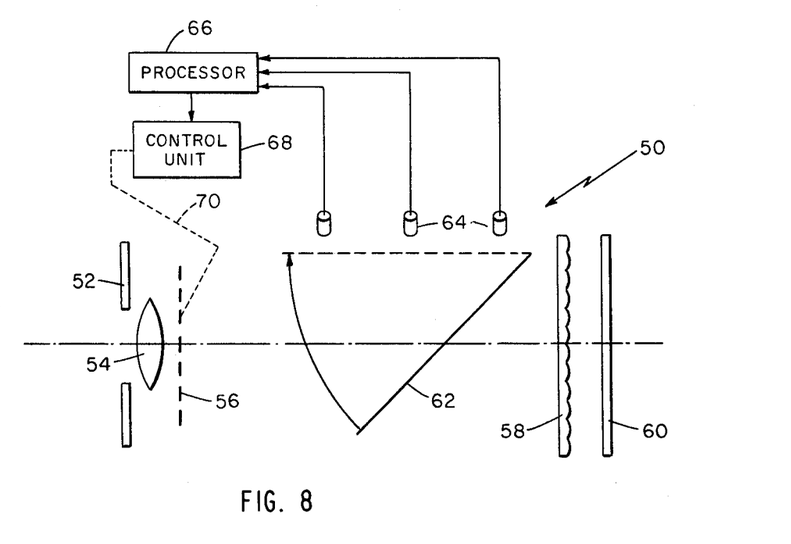
FIG. 8 shows an automatic camera system embodying further features of the invention.

Turning to FIG. 8, an automatic contrast-adjusting camera system 50 according to the invention has an aperture plate 52, a lens 54, an aperture screen 56, a distributing element 58, and a photosensitive recording medium 60 arranged in a manner similar to that described above with reference to the system 10 of FIG. 1. A hinged mirror 62, constructed for example similar to the viewing mirror in a single lens reflex camera, is in the optical path between the aperture screen 56 and the distributing element 58 for directing image light to an array of photosensitive detectors 64. For simplicity of illustration, FIG. 8 shows only three detectors 64, but it will be apparent to those skilled in the art that a greater number of detectors can be used in a one-dimensional or a two-dimensional array as appropriate for the overall control system employed. The mirror is normally in the position illustrated with the solid showing to intercept the light being directed onto the recording medium 60 when whatever focal-plane shutter element [not shown] provided is closed. Further, the mirror is pivoted to retract, when the shutter element of the camera system is opened, from the optical path to a position as shown with dashed lines to pass light to the distributing element 58 and the recording medium 60.

Each photosensitive detector 64 is arranged for receiving from the mirror 62, when in the normal light-intercepting position, light from a different portion of the scene being imaged on the photosensitive medium 60. Each detector in response produces an electrical signal corresponding to the intensity of the incident light it receives. A signal processor 66 processes the detector signals to compare the relative intensities in the scene, and determines the overall range of contrast in the scene. The processor in response produces a signal for driving a control unit 68 to adjust the aperture screen 56, by way of an interconnection 70. The control unit adjustment produces an effective aperture for illuminating the distributing element 58 to attain a microdistribution of light at the image surface which provides a contrast range suitable for the range of brightness sensed from the scene being photographed.

The automatic system 50 can, in place of the screen 56, employ an aperture control element of the kind described with reference to FIGS. 5 and 6. The control interconnection 70 can operate such an element in a similar manner as described for the screen 56. Another exemplary modification is to employ one or more scanning-type detectors to scan the image reflected from the mirror and produce a time-sequential signal for the processor. Alternatively, one can use a scanning type mirror in place of the illustrated mirror 62; or provide a set of detecting elements aligned with a further lens to provide an image of the scene.

Figure 9:
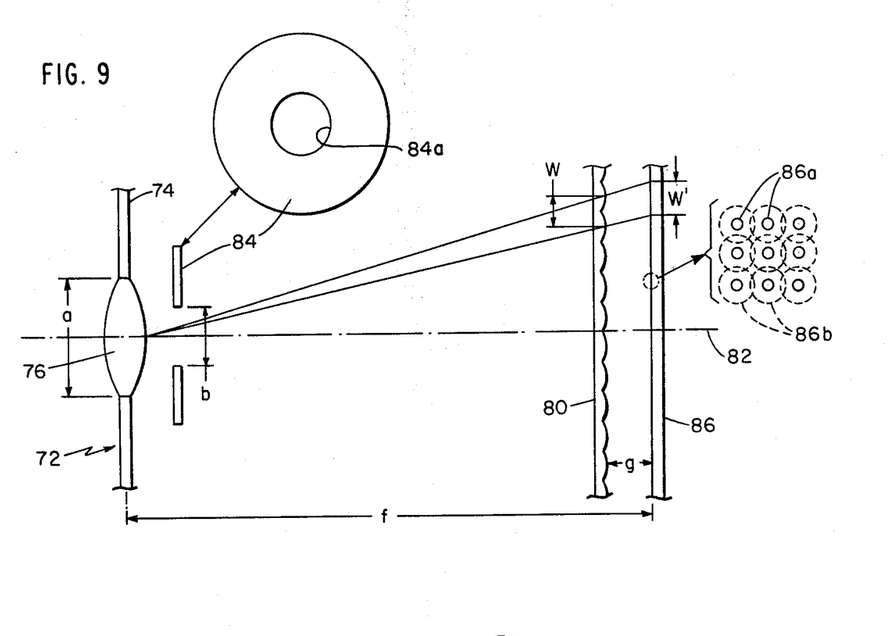
FIG. 9 is a schematic representation of another camera system according to the invention.

FIG. 9 shows a camera system 72 that features reduced contrast, as previously described, in addition to a degree of independent control over highlight exposure. The camera system has an aperture plate 74 mounted with a lens 76, and a distributing element 80, all arranged on an optical axis 82 in front of a photosensitive medium 86. The illustrated element 80 is a transparent panel with spherical lenticules formed on the posterior surface, as shown. In addition, a transmissive aperture element 84 is interposed along the optical axis 82 closely behind the lens. The illustrated transmissive aperture element is a non-opaque aperture stop of transmission (t) and having an open central aperture of diameter (b).

The transmissive aperture element 84 can provide adjustment of exposure for highlights relatively independently of reduction of contrast. More particularly, when the aperture (b) is sufficiently small and other system parameters satisfy the criteria discussed above with reference to FIG. 1, the distributing element 80 directs light from the aperture 84a to illuminate multiple bright portions 86a of the recording medium. The bright portions are non-contiguous and separated by surface portions of low exposure. The overall exposure of the medium from the scene of interest hence has reduced contrast, in the manner described previously. However, with the comparatively small aperture 84a required in order for the distributing element 80 to project well-separated bright portions 86a on the medium 86, as required for contrast reduction, a correspondingly long exposure may be needed to achieve minimum density in the direct positive-type medium of FIG. 3 in response to exposure by highlights. Otherwise, the highlights of the scene are likely to be underexposed.

However, the transmissive aperture element 84 delivers, through the annulus thereof surrounding the central opening, additional image light. The distributing element 80 projects this additional image light on the medium as annular image portions 86b. These image portions are concentric with and larger than the bright portions 86a, in correspondence with the geometry of the element 84. The resultant additional exposure of the sensitive medium 86 by the image light effectively metered to it in this manner through the annular portion of element 84 causes the medium to record highlights of the scene with proper density with a reasonably short exposure time.

With the transmissive element 84 in place as shown in FIG. 9, and assuming j=f (see FIG. 1), the bright image portions 86a have a width (b') given by the equation $$b' = gb/(f-g) \quad (7)$$

which may be somewhat less than the width w' given by equation (1) for the camera system of FIG. 1. At the same time, the larger aperture (a) of the lens 76 within plate 74, i.e. formed by light passing through the annular portion of transmissive element 84, forms images 86b with a width (a') of $$a' = ga/(f-g) \quad (8)$$

These images 86b may be larger than the width w' for FIG. 1 and therefore overlap one another, as shown for example in the inset of FIG. 9. The ratio of the light passing through the annular material portion of the element 84 relative to the light passing through the central aperture 84b corresponds to the ratio of these areas and hence can be expressed as the ratio:

$$t(a^2 - b^2)/b^2 \quad (9)$$

It is considered that the maximum optical transmission through the annulus of the element 84 be 10% or less of the total transmission through the element. Consequently where two of the larger image portions 86b overlap, the medium 86 receives through the annulus of the element 84 at most approximately 20% of the total transmission. For example, if the system of FIG. 9 is configured with the annulus diameter (a) being three times the aperture diameter (b), then the ratio of light passing through the annular portion relative to that passing through the central aperture is 8t. The transmission (t) for this condition will be 1/72 or less to ensure that the light passing through the annular portion is 10% or less of the total transmission of the aperture. These values are appropriate to yield highlight areas having the proper density-exposure relationship commensurate with the contrast reduction which the other elements in the system introduce.

The transmissive aperture element 84 can, of course, be adjustable to select the aperture diameter (b), and thereby control the relative transmission that forms the different image portions 86a and 86b. As a further example, the element 84 can employ two polarizing sheets rotatable relative to one another to provide control over the transmission (t).

With further reference to FIG. 9, the transmissive aperture element 84 can, instead of having neutral density, have a selected spectral absorption. This provides different control over different spectra of the recorded image. One application is with color photography, for color film typically has not one density-exposure curve as appears in FIG. 3, but three curves, not necessarily the same, for each of the primary colors red, green and blue. Thus, the camera system 72 of FIG. 9 can employ a transmissive aperture element 84 employing conventional color filter materials, i.e. cyan for restricting red light more than blue and green, magenta for controlling green, and a yellow filter for controlling blue light.

Figure 10:
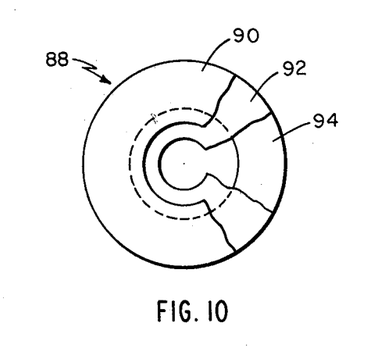
FIGS. 10 and 11 are plane and side elevation views of another transmissive aperture element.
Figure 11:
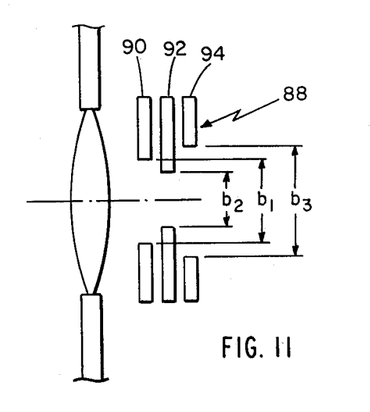

As an example of the above use of independent control of color, the camera system 72 can have a transmissive aperture element 88, as shown in FIGS. 10 and 11, constructed with two or more annular filters of different spectral properties and different dimensions. More particularly, FIGS. 10 and 11 show a transmissive element 88 having an annular cyan filter 90 with an inner diameter of $(b_1)$, an annular yellow filter 92 with an inner diameter of $(b_2)$, and an annular magenta filter 94 with an inner diameter $(b_3)$. The outer diameter of each filter is sufficient to cover the aperture (a). The filter diameter of this illustrated three-member aperture element are such that $b_3 > b_1 > b_2$, and the innermost diameter $(b_2)$ corresponds to the FIG. 9 aperture (b). Accordingly, all three filters overlap in an outermost annular region bounded by diameter (a) of the FIG. 9 lens 76 and plate 74 and the diameter $(b_3)$. This portion of the element hence serves as a dense neutral filter. In an intermediate annular region bounded by diameters $(b_3)$ and $(b_1)$, the cyan and yellow filters overlap, and hence green light passes. The yellow filter 92 alone forms an inner annular region bounded by diameters $(b_1)$ and $(b_2)$, and hence it passes red and green light. The element thus restricts blue light the most, red by an intermediate amount, and green least of all. This element 88 accordingly is appropriate for a color film for which the density-exposure curve for blue light is steeper than for red, and the green curve is least steep. Other filter arrangements in an aperture element will be apparent to pass different proportions of red, green and blue light as needed to keep the density-exposure curves at the desired relative values at the low density portions, i.e. the toe, of each curve. As one example, those familiar with film properties will understand that normally a red leak is not needed because red light is more able to scatter laterally within the layers of a photographic negative.

Further, the foregoing use of filters as described with reference to FIGS. 9 to 11 can be combined with the familiar use of color correction filters over the entire lens in effect to translate the entire density-exposure curve or set of curves along the log-exposure axis, as is well known.

Figure 12:
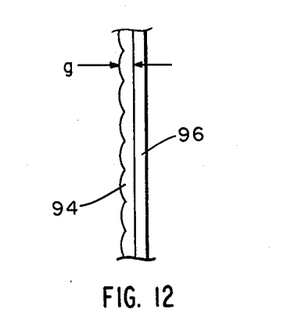
FIG. 12 shows a composite distributing element and recording medium structure for use in practice of the invention.

The camera systems described with reference to FIGS. 1, 8, and 9 employ a distributing element 22, 58 and 80, respectively, spaced from the image surface and hence from the photosensitive recording median by a distance sufficient to allow the medium, e.g. photographic film, to be loaded without interference with or scuffing of the distributing element. Also, the spacing keeps dust and other dirt that may be present on the distributing element out of focus, as is desirable. On the other hand, there are conditions where it is desirable to locate the distributing medium against the recording medium. As one instance, the choices for the parameters in the camera system may call for a spacing (g) (FIGS. 1 and 9) that is too small to accommodate the foregoing clearance, e.g. less than about 2.5 mm. Another instance is that as the spacing is reduced, the degree of contrast control becomes increasingly sensitive to the spacing and hence costly control over tolerance is required. To satisfy these and like conditions, the invention can be practiced with a distributing element attached to or placed against the recording medium so as to be fixedly located relative to it. FIG. 12 shows one such arrangement of a lenticular distributing element 96 contiguous with a photographic negative 98. The lenticule-forming side of the panel-like element 96 faces away from the photographic medium, so that the spacing parameter (g) is the thickness of the element, as shown.

The arrangement of a distributing element abutting the recording medium as FIG. 12 illustrates can be used in any of the camera systems described above. Further, it will be apparent that the distributing element can be separate from the recording medium and mounted in the housing of a camera system on a carriage or other mechanism to move it free of the medium, as for film loading and advance, and to abut it against the medium during exposure.

Alternatively, the record medium can carry the distributing element, and a film unit employing this feature can have a composite lenticule-negative structure such as FIG. 12 shows. Other embodiments of a fine absorbing or refracting pattern, as of stripes or dots, on or near the photosensitive medium can be used to attain contrast reduction in a camera system as described. Examples include imprinting dark stripes or dots on the top sheet of a photographic film unit. They can be of such fine patterns as not to be apparent during viewing of the resultant photo-record, or they can be applied in such a manner that they are bleached out during film processing.

A film unit or other recording medium bearing a light-distributing element for contrast reduction as described is used with an aperture control element such as the FIG. 1 aperture screen 24 or the other control structures described with reference to FIGS. 4 and 5 and 6. However, a distributing structure in such close proximity with the recording medium need not be periodic, e.g. it need not have an axis of periodicity. However, the distributing element integral or proximal with a recording medium preferably has a structure so fine that its image on the medium is beyond the resolving power of the medium, e.g. not resolvable by the dye transfer mechanism of a photographic film. The criteria, that the light-distributing element be of such microscopic dimension that its image is not resolved, is one distinction over prior art film structures such as those disclosed in the above-noted U.S. Pat. Nos. 1,838,173 and 2,992,103. A further distinguishing feature is that a recording medium exposed through a light-distributing element in the practice of this invention can be viewed independently of that element, which includes independently of location relative to the distributing element.

Further to the foregoing description of illustrative embodiments, the invention can be practiced, although less preferably at least for most applications, with a light-directing element that is optically absorbing. One such absorbing element is a grating with fine optically dense stripes separated by equal and clear or less dense gaps and which is optically reproducible as a sharp shadow image on the photosensitive medium. The directing element can also be an optical phase grating; as such it advantageously can be non-absorbing and of a design that images a pattern of high modulation or brightness contrast. A lenticular element as illustrated, however, is considered preferred as both non-absorbing and yielding better image modulation. It is to be noted that all these distributing element structures form coincident images of the aperture screen element at the image surface where the sensitive medium is located. And the distributing element is periodic in at least one direction longitudinal to this image surface.

It will also now be understood that the invention can be practiced with a camera system having no grid or other aperture element, e.g. the FIG. 1 screen 24, at the lens, provided the f-number of the lens is high, i.e. a lens aperture smaller than the dimension (d) discussed with reference to FIG. 1. Such an embodiment can employ a rotatable plate with a non-round aperture, or like device, for aperture control to adjust the degree of contrast reduction, with or without differing spectral controls, all as described above.

It will thus be seen that the objects set forth above, among those made apparent from the preceding description, are efficiently attained and, since certain changes may be made in carrying out the above processes and in the constructions set forth without departing from the scope of the invention, it is intended that all matter contained in the above description or shown in the accompanying drawings be interpreted as illustrative and not in a limiting sense.

It is also to be understood that the following claims cover all of the generic and specific features of the invention herein described, and all statements of the scope of the invention which, as a matter of language, might be said to fall therebetween.

Having described the invention, what is claimed as new and secured by Letters Patent is:

1. Camera apparatus for image recording with reduced contrast, said apparatus having support means for receiving an image recording medium at an image surface and having a lens aligned along an optical axis for directing light from a field of view along an optical path to the image surface, and further comprising
   A. light-distributing means arranged in the optical path between said lens and said image surface for modulating the distribution of image light from the lens across the image surface for effectively dividing the image surface into microscopic portions, different ones of which receive relatively increased exposure and others of which receive relatively lesser exposure, than in the absence thereof, from the image light, and B. aperture means interposed in said optical path anterior to said distributing means for illuminating said distributing means with image light to separate said image-surface portions of increased exposure spaced relative to one another to form portions of lesser exposure therebetween.

2. Camera apparatus as defined in claim 1 in which said distributing means includes an optical element selected from the group thereof comprising a transparency grating and a phase grating.

3. Camera apparatus as defined in claim 1 in which said distributing means has a grating-forming optical structure periodic along at least one axis longitudinal to said image surface.

4. Camera apparatus as defined in claim 1 in which said distributing means has a multiple-member optical structure the members of which form at said image surface plural substantially focused images of at least portions of said aperture means.

5. Camera apparatus as defined in claim 1 in which said distributing means includes a periodic lenticular grating having lens members each of focal length ($g_o$) and is spaced from said image surface by a distance (g) defined by $$1/(j-g)+1/g=1/g_o,$$

where (j) is the distance along said optical axis from said distributing means to said image surface.

6. Camera apparatus as defined in claim 1 in which said distributing means is located substantially at said image surface.

7. Camera apparatus as defined in claim 1 in which said distributing means is located substantially contiguous with said recording medium.

8. Camera apparatus as defined in claim 1 for use with a photographic recording medium and in which said distributing means includes optical absorbing or refracting means carried on said photographic recording medium and of such fine structure that the bright microscopic portions formed thereby at said image surface are beyond the resolving capability of the medium.

9. Camera apparatus as defined in claim 1 in which said light distributing means has a periodic structure of interval (w) spaced from said image surface by a distance (g), and in which said aperture means has an apparent aperture of dimension (d) measured parallel to the periodicity of said distributing means and which meets the equation $$d=wj/g$$

where (j) is the distance along said optical axis from said aperture means to said image surface.

10. Camera apparatus as defined in claim 1 in which said aperture means provides an aperture adjustable for changing the distribution of image light at said image surface.

11. Camera apparatus as defined in claim 1 in which said aperture means provides an aperture adjustable for changing the spacing between said image-surface portions of increased exposure.

12. Camera apparatus as defined in claim 1 in which said distributing means includes an optical grating element having a periodic structure along a selected axis longitudinal to said image surface, and in which said aperture means is adjustable to change the effective aperture, for image light incident on said distributing means, along a direction parallel to said axis of periodicity.

13. Camera apparatus as defined in claim 12 in which said aperture means forms plural image-light apertures, each of which is adjustable to change the dimension thereof parallel to said axis of periodicity.

14. Camera apparatus as defined in any one of claims 10, 11, 12 or 13 further comprising control means for sensing relative brightness in image light incident on said distributing means and adjusting said aperture means in response thereto.

15. Camera apparatus as defined in claim 1 in which said aperture means includes an optical screen member providing a plurality of image light apertures which illuminate said directing means for forming on said image surface bright exposure portions, at least some of which are substantially coincident.

16. Camera apparatus as defined in claim 1 in which said aperture means forms plural optical apertures, each of which illuminates said distributing means with image light which said distributing means directs to separated image surface portions with increased exposure with at least some such portions being substantially in register with those of other apertures.

17. Camera apparatus as defined in claim 1 in which said aperture means includes aperture defining means of selected spectral opacity providing a corresponding transmissivity to said image light, said transmissivity being less than the transmissivity of the aperture which said aperture means defines, and greater than that of totally opaque material.

18. Camera apparatus as defined in claim 17 in which said aperture means includes members of selected different spectral opacity arranged to provide plural image-light apertures at least some of which have different spectral transmissions from others.

19. Camera apparatus as defined in claim 17 in which said aperture means forms at least first and second sets of plural image-light apertures, with the apertures in each set having spectral transmission different from those of the other set.

20. Camera apparatus as defined in claim 19 in which said aperture means includes filter members providing each set of apertures with transmission principally for a different primary color from the other set.

21. Camera apparatus as defined in claim 1 further comprising means forming an aperture stop element of selected spectral transmission in optical alignment along said optical axis between said lens and said distributing means.

22. Camera apparatus as defined in claim 21 in which said stop element includes at least two stop members having different apertures and different spectral transmissions.

23. Camera apparatus as defined in claim 1 in which said light distributing means has a periodic structure of interval (w) spaced from said image surface by a distance (g), and in which said aperture means has a periodic structure with interval (d) measured parallel to the periodicity of said distributing means and which meets the equation $$d=wj/g$$

where (j) is the distance along said optical axis from said aperture means to said image surface.

24. Camera apparatus as defined in claim 1 in which said light distributing means has a periodic structure of interval (w) spaced from said image surface by a distance (g), and in which said aperture means has a single aperture, the dimension of which as measured parallel to the periodicity of said distributing means has a value substantially in the range between 1.2(d) and 0.5(d), where $(d) = wj/g$, and (j) is the distance along said optical axis from said aperture means to said image surface.

25. Camera apparatus as defined in claim 1 in which said distributing means includes a lenticular grating having a structure which is periodic along an axis longitudinal to said image surface.

26. Camera apparatus for image recording with optically-adjusted contrast, said apparatus having support means for receiving an image recording medium at an image surface and having a lens aligned along an optical axis for directing light from a field of view along an optical path to the image surface, and further comprising A. light-distributing means arranged in the optical path between said lens and said image surface for modulating the distribution of image light from the lens across the image surface for effectively dividing the image surface into microscopic portions, different ones of which receive relatively increased exposure and are non-overlapping and others of which receive relatively lesser exposure, than in the absence thereof, from the image light, and B. aperture stop means arranged along said optical path in front of said distributing means and having a selected spectral transmission.

27. Camera apparatus as defined in claim 26 in which said stop means includes an annular filter having neutral optical density circumferentially outside of a transmissive aperture.

28. Camera apparatus as defined in claim 26 in which said stop means includes at least two annular filters of different spectral transmissions arranged in optical alignment along the optical axis and having apertures of different sizes.

29. In the photorecording of an image on a medium at an image surface, the improvement comprising reducing the contrast of the recorded image, said reducing step including A. directing incident image light by light distributing means to different microscopic portions of the image surface, with some portions receiving relatively increased exposure and others receiving relatively decreased exposure from the image light, B. maintaining said former portions spaced relative to one another to form said portions of decreased exposure therebetween, and C. reading the recorded image independent of location relative to said distributing means.

30. A photorecording process for reducing the contrast of an image recorded on a medium at an image surface, said process comprising the steps of A. directing incident image light by light distributing means to different microscopic portions of the image surface, with some portions receiving relatively increased exposure and others receiving relatively decreased exposure from the image light, and B. selecting the aperture from which image light is incident on said distributing means for maintaining said former portions spaced from one another.

31. A photorecording process according to claim 30 in which said aperture selecting step includes providing plural image-light apertures, each of which is of sufficiently small size for directing image light to plural surface portions of relatively increased exposure that are spaced apart and at least some of which are substantially coincident with like portions produced from other of said apertures.

32. A photorecording process according to claim 30, comprising the further improvement A. wherein said directing step includes directing image light to said image surface portions with distributing means having distribution structure with periodicity along at least one axis longitudinal to said image surface, and B. wherein said aperture selecting step includes selecting the aperture size along a direction longitudinal to said axis of periodicity.

33. A photorecording process according to claim 30 wherein said aperture selecting step includes providing a single aperture sufficiently small in at least one direction for illuminating the distributing means for directing image light to plural surface portions of relatively increased exposure which are non-contiguous with one another.

34. A photorecording process according to claim 30 comprising the further improvement A. wherein said directing step includes directing image light to said image surface portions with distributing means having distribution structure with periodicity along at least one axis longitudinally to said image surface, and B. wherein said aperture selecting step includes providing multiple image-light apertures, each of which is sufficiently small for directing image light to plural surface portions of relatively increased exposure that are spaced from one another, and selecting the size of at least some of said multiple apertures along a direction longitudinal to the direction of periodicity of said distributing means.

35. A photorecording process according to claim 30 comprising the further step of illuminating the distributing means with image light additional to that from the selected aperture for distribution thereby onto further image surface portions larger than and overlying said portions of relatively increased exposure.

36. A photorecording process according to claim 35 in which said illuminating step comprises transmitting said additional light to said distributing means through filter means located radially outwardly from the selected aperture.

37. A photorecording process according to claim 30 comprising the further step of providing annular filter means circumferentially about the selected aperture and having, for a selected spectral range being recorded, at least one selected transmission different from that of the aperture located radially inward from said filter means.

38. A photorecording process according to claim 30 comprising the further step of changing said selected aperture thereby selectively to reduce the contrast.

39. A photorecording process according to claim 30 comprising the further steps of A. sensing the range of image-light brightness incident on the distributing means, and
B. changing the size of said aperture for reducing contrast selectively in response to the sensed range of image brightness.

40. A photorecording process according to claim 39 comprising the improvement
A. wherein said directing step includes directing image light to said image surface portions with distributing means having distribution structure with periodicity along at least one axis longitudinal to said image surface, and
B. wherein said aperture changing step includes changing aperture size along a direction longitudinal to said axis of periodicity.

41. A photorecording process according to claim 30 comprising the further step of locating said distributing means substantially contiguous with said recording medium.

42. A photorecording process according to claim 30 comprising the further step of spacing said distributing means from said recording medium at least by a clearance distance.

* * * * *